UNITED STATES PATENT OFFICE.

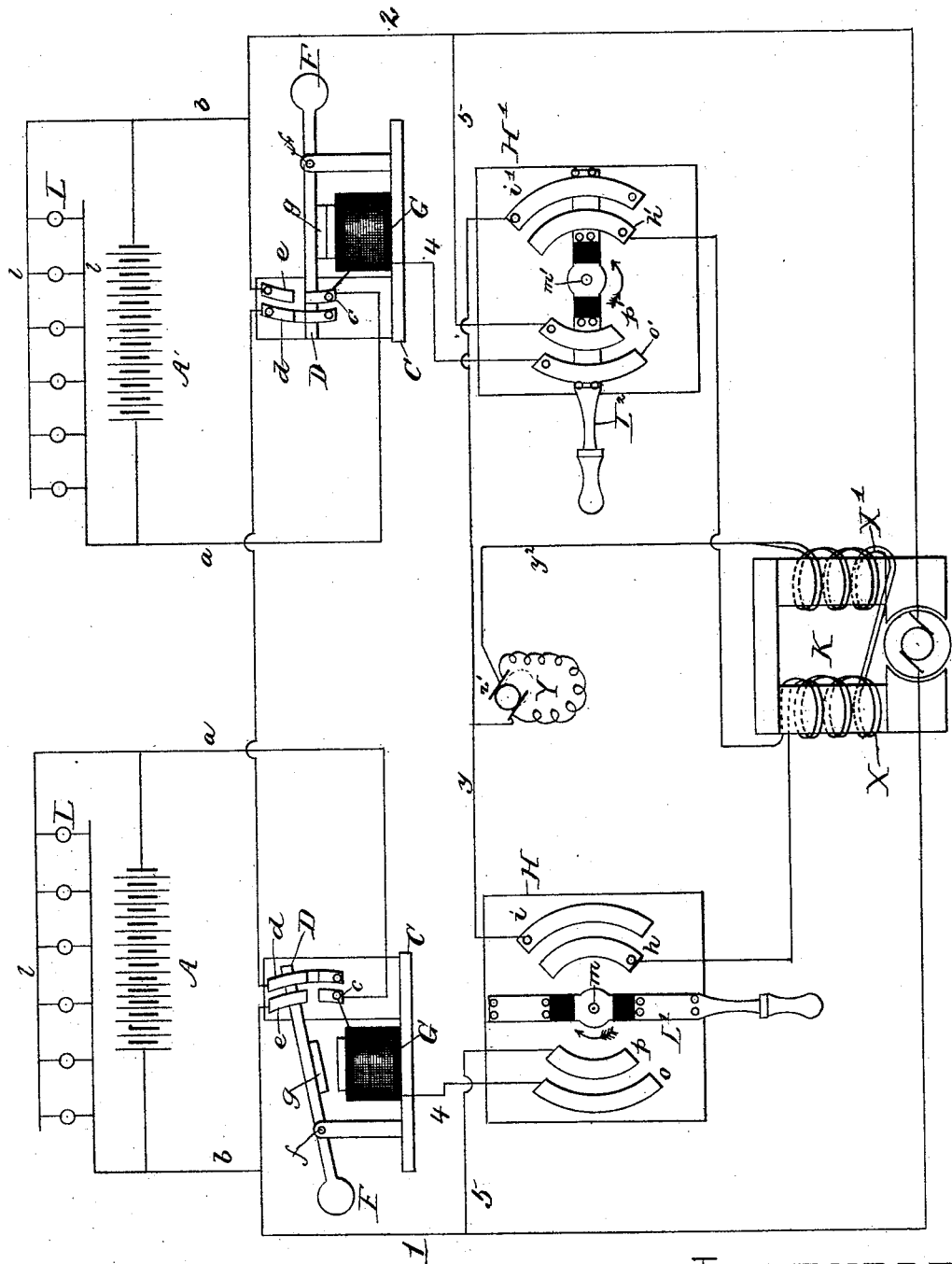

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

SYSTEM OF ELECTRICAL DISTRIBUTION BY SECONDARY BATTERIES.

SPECIFICATION forming part of Letters Patent No. 415,766, dated November 26, 1889.

Application filed March 8, 1889. Serial No. 302,456. (No model.)

*To all whom it may concern:*

Be it known that I, STANLEY C. C. CURRIE, a subject of the Queen of Great Britain, residing at Philadelphia, in the county of Philadelphia and State of Pennsylvania, have invented certain new and useful Improvements in Systems of Electrical Distribution; and I do hereby declare the following to be a full, clear, and exact description of the invention, reference being had to the accompanying drawing, which forms part of this specification.

This invention has relation to systems of electrical distribution, and relates in particular to that class of electrical distributive systems wherein a number of accumulators or secondary batteries in separate groups are employed as distributing-centers for independent districts and are arranged in series upon a single main conductor leading from and to a source of electric supply.

In Letters Patent No. 400,395, March 26, 1889, I have shown and described a system wherein a number of groups of accumulators or secondary batteries are arranged for charging in series upon a single main-line conductor with an equal number of dynamo-electric generators, and wherein certain manual and electro-magnetic switches are provided and so arranged that each dynamo and its corresponding accumulator or secondary battery or group of the same may be thrown into and out of circuit simultaneously from the charging-station.

My present invention is an improvement upon the system shown and described in my above-mentioned patent, and has for its object the provision of novel means whereby a lesser number of dynamo-electric generators may be employed than there are groups of accumulators or secondary batteries in circuit, while means are provided for independently switching each or any of said groups of secondary batteries out of or into the main charging-circuit at will from the charging-station.

In carrying my present invention into effect I employ the same general arrangements and construction of parts as are shown and described in my aforesaid patent, with the exception that, instead of employing a number of dynamo-electric machines equal to the number of groups of secondary batteries or accumulators, I use one dynamo for two or more groups of accumulators or secondary batteries, such dynamo having its field-magnets wound in separate coils equal in number to the number of groups of secondary batteries or accumulators which such dynamo is intended to supply with current.

In the drawing accompanying this application I have shown the construction of the necessary manual and electro-magnetic switches, the arrangements of the several circuits, and the improved manner of winding and arranging the electric generators, and in the said drawing 1 designates the main-line conductor, and 2 the return-circuit of the same.

A A′ designate individual sets or groups of secondary batteries or accumulators, and L L lamps arranged on lines 1 1, leading from said accumulators. The accumulators A A′ are electrically connected to the main line 1 by branch conductors $a\ b$. The conductors $b$ lead directly to and are permanently connected to the main line 1, while the conductors $a$ terminate at a contact-point $c$ on switch-board C.

The conductor 1 is divided into sections, as shown, which terminate at contact-points $d\ e$ on the switch-board C C, and a pivoted switch-lever D on each board connects the contact-points $d\ d$ with the points $c$ and $e$ alternately, according to its position. The levers D are pivoted at $f$ and are provided with counter-weights or springs F, which serve, under the normal condition of affairs, to bear down the outer ends of the levers D and preserve circuit between the points $d\ e$. Small electro-magnets G are mounted on switch-boards C below the levers D, and the armatures $g\ g$ of said magnets are attached to said levers, so that when the magnets are energized the lever will be drawn down and the circuit thereby established between the contact-points $c$ and $d$.

H H′ designate switch-boards arranged at the dynamo-station or at other appropriate points, and upon the board H are contact-points $h\ i\ o\ p$, and upon the board H' similar contact-points $h'\ i'\ o'\ p'$. Switch-levers L' L² are pivoted upon the boards H H' at $m\ m'$, and the said levers are double-ended, the ends being insulated from one another. The switch-lever L' is shown in such position that the contact-points $o\ p$ and $h\ i$ are disconnected, while the lever L² is swung around and into such position as to connect the contact-points $o'$ with the contact-point $p'$, and simultaneously connects the contact-point $h'$ with contact-point $i'$. The contact-points $o\ o'$ form the terminals of lines 4 4, leading through magnets G G to contact-points $c\ c$, and the contact-points $p\ p'$ are connected by lines 5 5 with the main line 1 2.

K designates the main generator, the brushes of which are connected to the main line 1 2, while its field-magnets are wound in two separate coils X X', these coils being arranged parallel with one another and in circuit with an exciting-generator Y. The generator Y is shunt-wound, and line $y$ leads from one of its brushes to the contact-points $i\ i'$ of switch-boards H H'. At one end the two terminals of the coils X X' are connected by a line $y^2$ to the brush $z'$ of generator Y, while the opposite ends of these coils are respectively connected to the contact-points $h\ h'$.

As shown in the drawing, the coil X' of the main-generator K is in a closed circuit with the generator Y by way of lines $y^2\ y$, contact $i'$, lever L², contact $h'$, and thence to other terminal of the coil. The circuit of coil X is open between contact-points $h\ i$ by reason of position of switch-lever L'. The size and winding of the coil-wire on the field-magnets of the main generator must be in accordance with the relative increase and decrease of the magnetic field—that is to say, the proportionate increase and decrease of lines in field when an extra coil-circuit is completed must be such as to make suitable increase in the electro-motive force of dynamo relative to the extra battery brought into circuit, assuming of course that the speed of armature is constant.

While the drawing shows an arrangement for two groups of batteries, it is to be understood that the same arrangement may be applied to any number of groups of batteries, the number of separate field-coils being of course the same as the number of groups of batteries.

Operation: The parts, being constructed and arranged as above described, operate in the following manner: In the drawing the accumulator A and its corresponding coil X are represented as being inactive—that is, the circuit of the coil X has been broken between the contact-points $h\ i$, and the auxiliary circuit 4 5 has also been broken at points $o\ p$, whereby the magnet G is de-energized, allowing its armature $g$ and the lever D to rise, breaking contact between $c$ and $d$ and establishing contact between $e$ and $d$. When it is desired to throw the accumulator A into the main-line circuit, the handle of switch-lever L' is turned in the direction of the arrow, and circuit thereupon established through the lines 5 4 and magnet G, which latter, becoming energized, attracts the armature $g$ and establishes circuit through contact-points $c$ and $d$. The opposite end of the lever L' simultaneously establishes contact between points $i$ and $k$, thereby closing the circuit of coil X. A reverse movement of the handle L' will of course break circuit of coil X and simultaneously open the circuit of lines 5 4, and thereby throw accumulator A out of circuit of main line. The accumulator A' is shown in circuit with the main line, and the coil X' of the main generator is in circuit with the exciting-generator Y. To open-circuit the coil X' and throw the accumulator A' out of circuit with the main line, it is only necessary to turn the lever L² in the direction of the arrow, thereby breaking circuit between points $h'\ i'$ and points $o'\ p'$.

Having described my invention, I claim—

1. In a system of electrical distribution, the combination, with a main-line conductor, an electric generator having its field-magnets wound with separate coils, and a number of groups of secondary batteries or accumulators equal to the number of coils on said field-magnets, of a manually-operated switch appropriated to each coil and adapted to throw said coil into or out of the main circuit, and an electro-magnetic switch appropriated to each group of batteries and having its operating-magnet arranged in a shunt-line from the main line through the battery, whereby the operation of each manual switch will simultaneously throw one of the coils of the generator and one group of batteries into the main-line circuit, substantially as described.

2. In a system of electrical distribution, the combination, with a single electrical generator having its field-magnets wrapped with a plural number of separate coils, a plural number of electric distributing devices, as storage-batteries or the like, and a main-line conductor, of a manually-operated switch and an electrically-operated switch appropriated to each separate coil of the generator, connected by a conductor, and so arranged that the movement of the manual switch will establish circuit through said electrically-operated switch, and thereby throw its group of accumulators and appropriate coil simultaneously into the main-line circuit, substantially as described.

In testimony that I claim the foregoing I have hereunto set my hand this 11th day of February, 1889.

STANLEY C. C. CURRIE.

Witnesses:
JOHN RODGERS,
A. B. STOUGHTON.